July 30, 1929.  L. F. BEAULIEU  1,722,265
INTERIOR AUTO CLEANER
Filed March 26, 1928
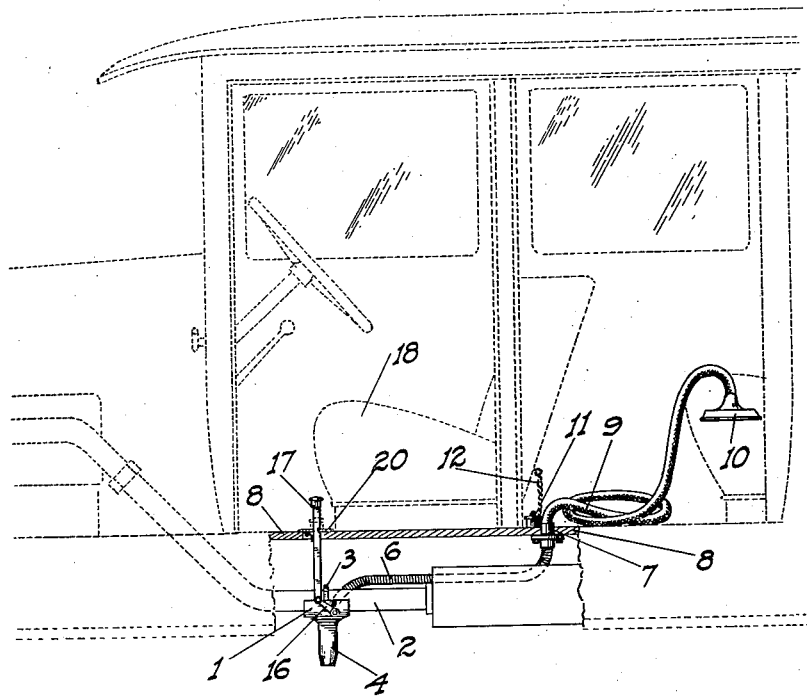
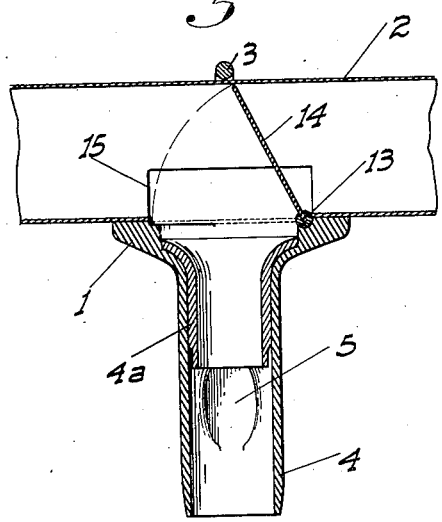
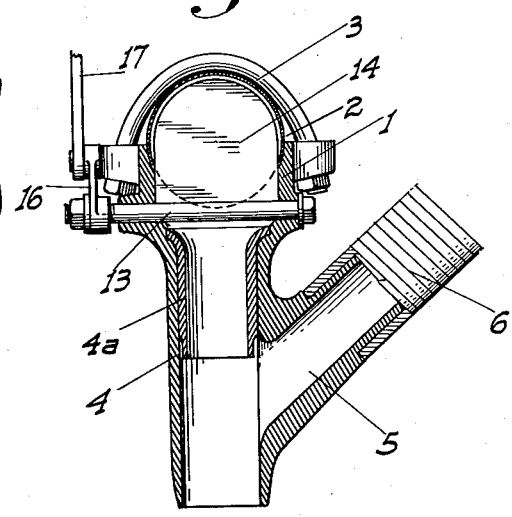
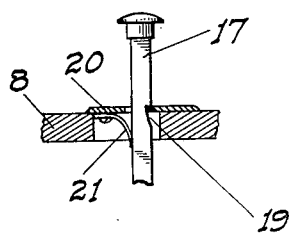
INVENTOR
L. F. Beaulieu
BY
ATTORNEY Patented July 30, 1929.

1,722,265

UNITED STATES PATENT OFFICE.

LESTER FILLMORE BEAULIEU, OF LINCOLN, CALIFORNIA, ASSIGNOR OF ONE-THIRD TO CORNELIUS R. KENNEDY AND ONE-THIRD TO HIRAM A. DRANE, OF LINCOLN, CALIFORNIA.

INTERIOR AUTO CLEANER.

Application filed March 26, 1928. Serial No. 264,790.

This invention relates to devices for cleaning the interiors of motor vehicles by means of a vacuum obtained in connection with the operation of the engine of the vehicle, such as for instance is shown in my Patent No. 1,657,707, dated January 31, 1928.

The principal object of the present invention is to provide a structure for this purpose so arranged that the necessary vacuum will be obtained from the exhaust of the engine without the use of any fan or other mechanism driven by the exhaust as was the case in the previous device. The present structure is therefore much more simple and less expensive to manufacture and there is nothing to get out of order or wear out.

A further object of the invention is to construct a device so that it may be very easily attached to the exhaust pipe without removing the latter or having to change its normal position and form.

These objects I accomplish by means of such structure and relative arrangement of parts as will fully appear by a perusal of the following specification and claim.

In the drawings similar characters of reference indicate corresponding parts in the several views:

Fig. 1 is a fragmentary side outline of a motor vehicle showing my improved vacuum cleaning attachment installed thereon.

Fig. 2 is a longitudinal section of the vacuum forming member.

Fig. 3 is a transverse section of the same.

Fig. 4 is a fragmentary view showing the gas valve controlling rod.

Referring now more particularly to the characters of reference on the drawings, the numeral 1 denotes a saddle of suitable length adapted to extend partially about and be strapped to the exhaust pipe of an automobile engine by means of a U bolt 3. Depending from the saddle is a passage member 4 open on the bottom, from one side of which intermediate its ends a lateral branch passage 5 extends upwardly at an acute angle thereto.

A length of flexible heat resisting hose 6 is connected to the outer end of the branch 5 and extends thence to a fitting 7 which projects upwardly through and is secured to the floor 8 of the car, preferably at the forward end of the rear compartment. This fitting is detachably engaged by one end of a flexible hose 9 having a suitable vacuum cleaning nozzle 10 on its opposite end. A cap 11 is preferably permanently mounted in the car in the compartment by a chain 12 or the like, being adapted to be placed over the fitting 7 when the detachable hose is removed therefrom.

Mounted in the saddle at the rear end of the member 4 is a transverse shaft 13 on which is fixed a flap valve 14, adapted to be swung down to a horizontal position or upwardly to then form a closure in the exhaust pipe rearwardly of the member 4. To permit of this movement and also to provide an opening between the exhaust pipe and the passage 4, said pipe has a section cut out of the bottom thereof as at 15, the area of this cut-away portion being substantially the size of the valve, and of course being closed to the immediate atmosphere by the surrounding saddle portions. To the outer end of the shaft 13 a radial arm 16 is fixed, to the outer end of which an upwardly projecting actuating rod 17 is connected. The saddle device is located in the exhaust pipe so that the rod may project straight up through the floor 8 just ahead of the front seat 18. The valve and its associated parts are so arranged that when the rod is depressed to a point near the floor, the valve will then be in a horizontal position and will shut off the passage 4 from the exhaust pipe. When said rod is pulled upwardly, however, the valve is moved to a substantially vertical position so that the exhaust pipe is shut off beyond the passage 4, and the exhaust gases must therefore pass from the engine into said passage 4 and thence to the atmosphere.

To enable the rod to be thus held upwardly I preferably provide a notch 19 in one side thereof to detachably engage a slotted plate 20 fixed on the floor and through which the rod projects; a spring 21 acting against the rod to hold the notch thus engaging it.

In operation it will be seen that when the valve is in a horizontal position the exhaust gases will flow unobstructed past the passage floor and to the muffler as usual. When the valve is raised, however, the exhaust gases can only escape through the passage 4 as before mentioned. This movement of the gas will induce a suction or partial vacuum in the branch passage 5 and the suction nozzle connected thereto. This suctional force will be proportionate to the speed of the engine and consequent volume of the exhaust gases, and I have found from actual experiment that if the engine is operated at a speed such as to register a full charging rate on the ammeter, the suctional force set up will be sufficient to cause good sized gravel particles and other comparatively weighty solid substances to be drawn into the nozzle and thence onto the ground through the passage 4. The device therefore serves especially to clean the floor of the car of all dirt, etc., which may be brought into the same by the feet of the occupants, as well, of course, as being efficient to remove dust from the cushions and upholstering generally.

In order to prevent a possible "kick-back" of the exhaust gases through the suction hose, a sleeve 4ª is mounted in the passage 4, said sleeve projecting downwardly to a point a short distance below the upper edge of the suction passage 5 and being spaced from the walls of the passage 4 at its lower end, as shown.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

In a vacuum cleaning attachment for a motor vehicle which includes a suction passage member arranged to communicate with the exhaust pipe of the vehicle intermediate its ends, and a valve to selectively control the closing of said passage to the pipe or the closing of the pipe rearwardly of the passage; a vertical control stem for the valve projecting upwardly through the floor of the vehicle and arranged for vertical movement to selectively shift the valve, said stem being depressed when the valve is in said first named position, and catch means for releasably holding the stem in a raised position.

In testimony whereof I affix my signature.

LESTER FILLMORE BEAULIEU.